Sept. 11, 1956  R. F. THOMPSON ET AL  2,762,242
SAW SHARPENING MACHINE

Filed May 31, 1951  6 Sheets-Sheet 1

FIG.—1

INVENTORS
Roy F. Thompson &
Ruben J. Hartmeister
BY
*H. A. McGrew*
ATTORNEY

Sept. 11, 1956  R. F. THOMPSON ET AL  2,762,242
SAW SHARPENING MACHINE
Filed May 31, 1951  6 Sheets-Sheet 3

INVENTORS
Roy F. Thompson &
Ruben J. Hartmeister
BY
*H. A. McGrew*
ATTORNEY

INVENTORS
Roy F. Thompson &
Ruben J. Hartmeister
BY
ATTORNEY

Sept. 11, 1956

R. F. THOMPSON ET AL 2,762,242

SAW SHARPENING MACHINE

Filed May 31, 1951

INVENTORS
Roy F. Thompson &
Ruben J. Hartmeister
BY
*M. A. McGrew*
ATTORNEY

Sept. 11, 1956  R. F. THOMPSON ET AL  2,762,242
SAW SHARPENING MACHINE
Filed May 31, 1951  6 Sheets-Sheet 6

INVENTORS
Roy F. Thompson &
Ruben J. Hartmeister
BY
*H. A. McGrew*
ATTORNEY

United States Patent Office 2,762,242
Patented Sept. 11, 1956

2,762,242

SAW SHARPENING MACHINE

Roy F. Thompson, Arvada, and Ruben J. Hartmeister, Golden, Colo.; said Hartmeister assignor to said Thompson Application May 31, 1951, Serial No. 229,214

8 Claims. (Cl. 76—43)

This invention relates to a saw sharpening machine and more particularly to a machine of the type indicated that is adapted to expeditiously and accurately sharpen all types of hand saws.

Among the objects of this invention is to provide a mechanism that may be used to conveniently sharpen hand and other types of rectilinear saws irrespective of the tooth spacing of such saws.

Another object of this invention is to provide a mechanism that may be adjusted to correctly bevel and form saw teeth of an efficient design as necessary to satisfy the purposes for which the saw is to be used.

A further object of this invention is to provide an automatic gauging apparatus that will correctly space the saw teeth as desired.

Among additional objects of this invention is: to provide novel means for holding a saw that is to be sharpened; to provide an indexing mechanism for initially aligning previously cut saw teeth with the saw sharpening devices of this invention; to provide indices of the horizontal and vertical angularity of a saw with respect to the positioning of the saw sharpening members used in accordance with this invention; to provide novel means for adjusting the depth of cut and accordingly the depth of tooth desired; and, to provide an elongated cutting drum having equally spaced ridges thereon positioned and adapted to cut teeth in the face of saws passed into contact therewith.

Further and additional objects of the present invention will be apparent from the appended description and drawings in which.

Briefly stated, the present invention provides a frame upon which a driven cutting drum is mounted for rotation. The cutting drum itself is provided with a plurality of ridges of a form adapted to cut saw teeth as desired. The frame provides support for a tilting table, the positioning of which may be adjusted to determine the depth of cut that is to be made in the face of the saw. A sliding table which supports a saw clamping mechanism is mounted for reciprocal movement along the tilting table as necessary to bring the saw which is held by the clamping mechanism into engagement with the rotating cutting drum. As the saw is brought into contact with the rotating drum, a plurality of spaced teeth will be cut in the face thereof. Since it is desirable to provide a single unit that is adaptable for cutting different numbers of teeth per unit length, it is preferred that the ridges of the cutting drum should be spaced apart 2 inches or some corresponding unit of measure. With the ridges equally spaced, the selector mechanism which shifts the positioning of the tilting table with respect to the frame may be used to cut any desired number of teeth per unit of length. Accordingly, through proper use of the selector mechanism it is possible to cut 9, 12, 16 or any other desired number of teeth per inch.

Figure 1:
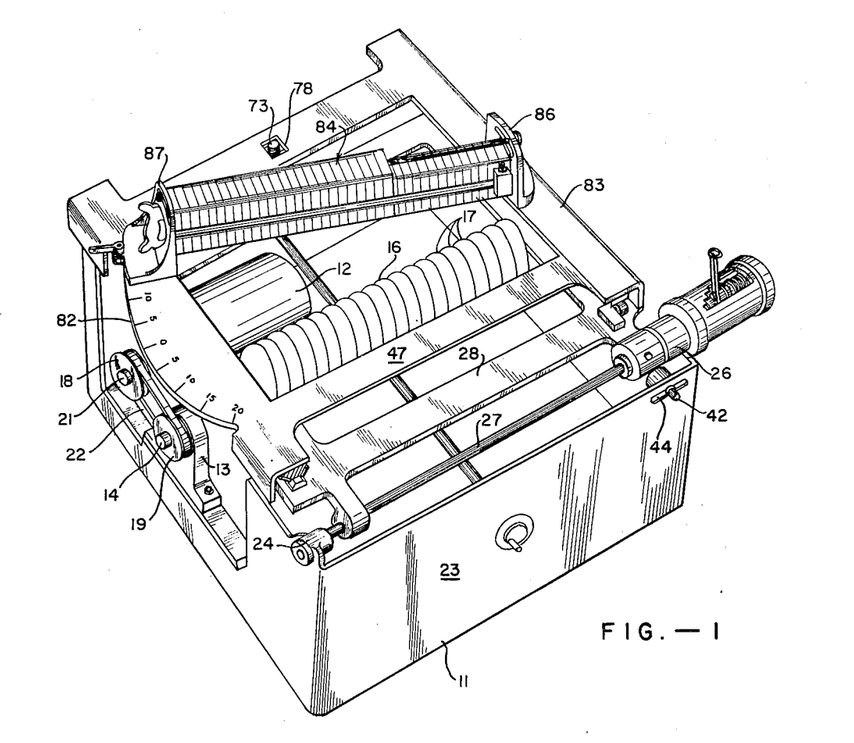
Fig. 1 is a perspective view showing the saw sharpener of this invention in assembled relation.

Referring now to the drawings, the features of this invention are in general best shown in Fig. 1. In this figure it is to be noted that the inventor provides a box-like frame structure 11 upon which the operative elements in the invention are disposed. The lower or closed portion of the box frame section 11 is accordingly used to provide support for a drive motor 12 and bearing supports 13, which are arranged in parallel relationship to the motor 12. These bearing supports 13 provide journals for the shaft 14 of an elongated cylindrical drum of abrasive material which forms a tooth cutting device or cutting drum 16. Preferably the cutting drum 16 is dressed to provide a plurality of spaced ridges 17 thereon of a form as necessary to cut the desired type of teeth on the saw that is to be dressed.

For the purpose of dressing conventional type hand saws, the separate ridges 17 are preferably spaced apart a distance of 2 inches. Further, since it may be desirable to provide more than one form of tooth for the saws that are to be dressed, the cutting drum 16 is easily removable from the frame 11 by removing the bearing support blocks 13. While a geared or other type of drive is possible, the inventor prefers to use pulleys 18 and 19 respectively on the motor shaft 21 and the cutting drum shaft 14 that are interconnected by means of a drive belt 22 as necessary to rotate the cutting drum 16.

The walls 23 of the box structure 11 provide support for aligned bearing members 24 and 26 disposed on opposite walls 23. These bearing members 24 and 26 rotatably support the shaft 27 which provides pivotal and sliding support for the tilting support table 28.

Figure 2:
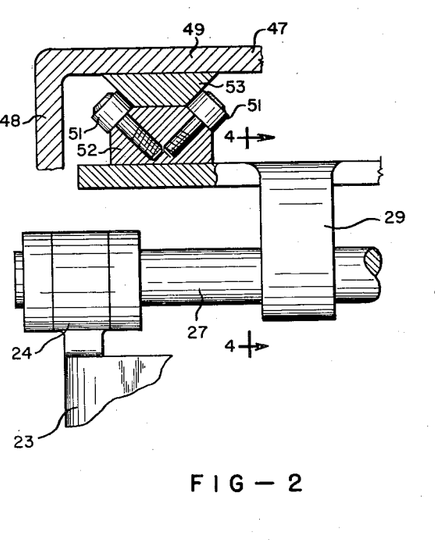
Fig. 2 is an elevational view showing features of the saw support and slide table mountings.
Figure 3:
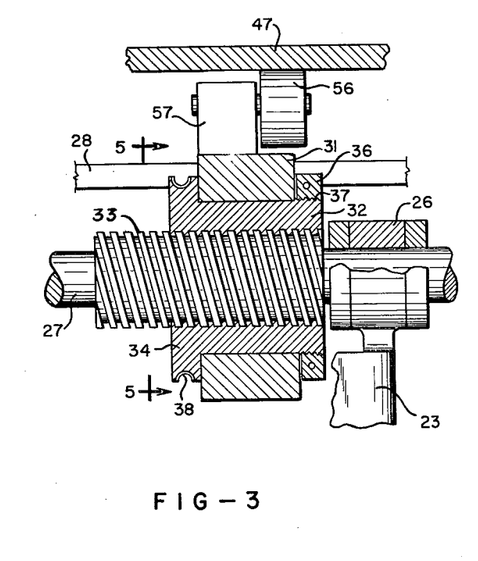
Fig. 3 is an elevational view showing additional features of the saw support and slide table mountings and initial features of a tooth spacing device.
Figure 4:
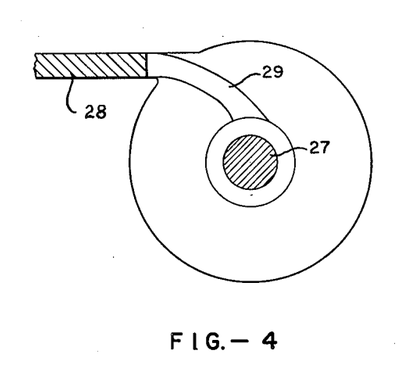
Fig. 4 is a view taken along the line 4—4 of Fig. 2 showing the engagement between the support table and the support rod.

The exact structure interconnecting the support table 28 and shaft 27 is best shown in Figs. 2, 3 and 4, where it will be noted in Figs. 2 and 4, that a bearing extension 29 at one end of the support table 28 slidably and rotatably engages the shaft 27, while the bearing support 31 at the opposite end of the table 28 is rotatably secured about an adjusting nut 32, which is in threaded connection with a screw thread 33 formed on or integrally attached to the shaft 27. In order to hold the bearing 31 in adjusted lateral position with respect to the nut 32, the bearing 31 is held between a shoulder 34 on the nut 32 and a lock nut 36 that is secured by means of threads 37 to the nut 32. From this arrangement it should be noted that the tilting support table 28 may be moved longitudinally with respect to the shaft 27 whenever the shaft is turned to rotate the screw thread 33 with respect to the nut 32 or whenever the nut 32 is rotated with respect to the screw thread 33. Each of these types of relative movement is used during the operation of this mechanism to separately adjust and space the positioning of the teeth being cut in the saw blade.

Figure 5:
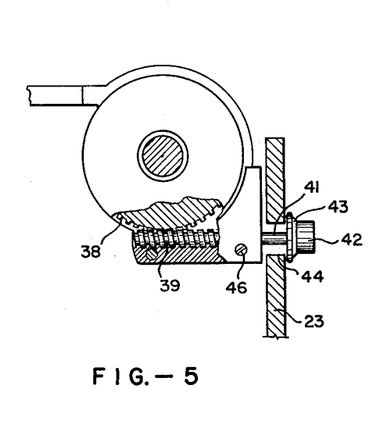
Fig. 5 is an elevation taken along the line 5—5 of Fig. 3 showing the features of an initial adjusting mechanism.

When a saw is first being mounted on the saw sharpening apparatus disclosed, the second type of adjustment is used to make minor adjustments in the positioning of the saw with respect to the grinding wheel surfaces. To facilitate such adjustment, the mechanism shown in Figs. 3 and 5 is utilized. As shown in these figures, adjusting nut 32 has a raised shoulder portion 34 upon the outer face of which a gear 38 is cut. The teeth gear 38 are designed for intermeshing engagement with worm gear 39, the supporting shaft 41 of which extends through wall 23 of frame 11. On the outer end of shaft 41, a knob 42 is placed to facilitate rotation of the worm gear 39. Indexing marks, not shown, are preferably cut on the face of the skirt portion 43 of knob 42 to facilitate proper adjustment of the adjusting nut 32 with respect to the screw thread 33. Since the worm drive gear 39 must move with the adjusting nut 32, a slot 44 is provided in the face of the wall 23 through which the shaft 41 may extend. Further, since the slot 44 cannot provide support for the shaft 41 as necessary to hold the worm drive gear 39 in engagement with the gear 38 on adjusting nut 32, a housing 46 is provided which is adapted to hold the gears 38 and 39 in intermeshing arrangement.

Saws that are to be sharpened must be moved into contact with the grinding drum 16 in a direction of movement that is generally transverse to the alignment of the grinding wheel shaft 14. Accordingly, a sliding table 47 is mounted for reciprocal motion above and with respect to the tilting table 28. Sliding table 47 which has downwardly turned edges 48 is further provided with truncated V-shaped guide ways 49 along its lower face at least on one side of the table. This guideway 49 is adapted for contact with guide rollers 51 mounted on support blocks 52 secured to tilting table 28 at angles which assure rolling or line contact between the surfaces of the rollers 51 and the angularly disposed faces 53 of the guideway 49, the sliding table 47 will be constrained for straight line movement along the tilting support table 28.

While aligned guideways 49 and rollers 51 may be provided on both the front and back edges of the table 47, a single guideway 49 and associated rollers is adequate to assure the desired straight line motion. Accordingly as shown in Fig. 3, the back portion of the sliding table 47 may satisfactorily be supported by support rollers 56 mounted above the tilting table 28 and secured thereto for rotation about an axis parallel to the sliding table 47 by means of an axle support block 57 affixed to the upper surface of the tilting table 28.

Figure 6:
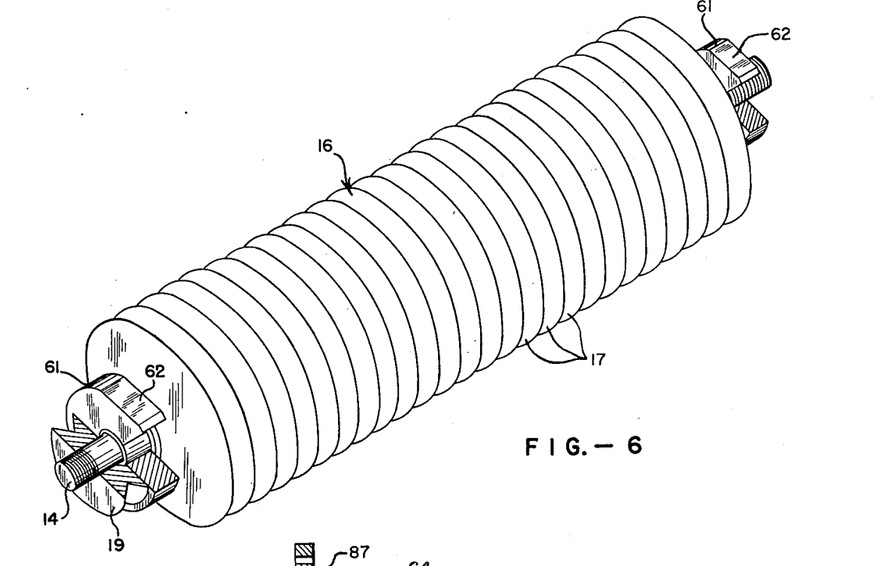
Fig. 6 is a perspective view of the saw tooth grinding drum.
Figure 7:
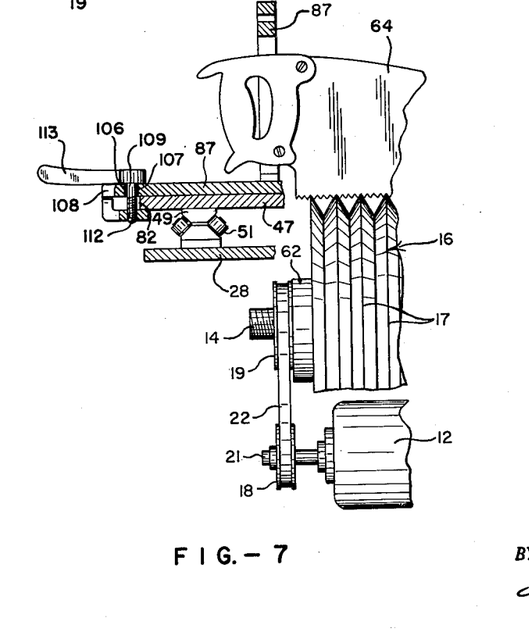
Fig. 7 is a partial elevational view showing the operational positioning of the grinding drum with respect to a saw blade.

Additional features of the grinding wheel and the grinding wheel drive arrangement are shown in Figs. 6 and 7. It should be noted in Fig. 6 that the end bearings 61 have a small segment 62 removed from their otherwise cylindrical surface to facilitate proper alignment of the bearing 61 and to allow additional clearance between the grinding drum 16 and the tilting table 28. With this segment removed, it is possible to lower the tilting table 28 an additional distance as necessary to cut deep teeth in saws being sharpened. Further, as the grinding drum 16 is re-dressed, a longer life will be possible because of the additional clearance provided. The spacing of the cutting edges 17 with respect to the placement of teeth on a saw blade 64 is shown in Fig. 7. Here adjacent ridges 17 are shown dressing each fifth tooth 63 of the saw blade 64.

Figure 8:
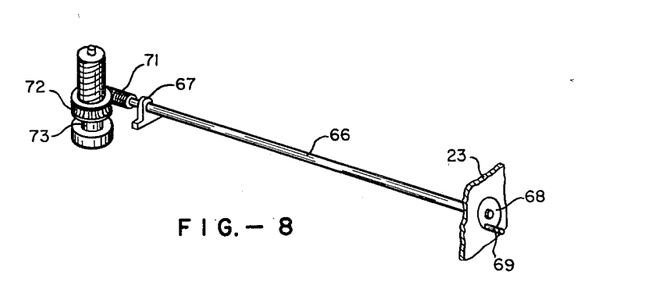
Fig. 8 is a perspective view showing the support table adjusting mechanism used to control the depth of contact between the saw blade and grinding drum.
Figure 9:
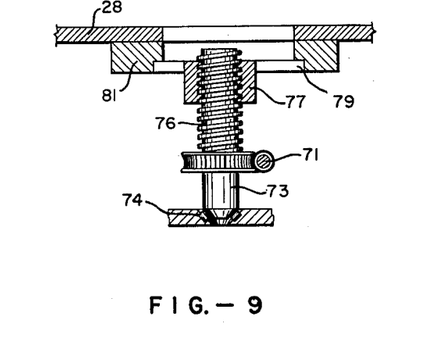
Fig. 9 is an elevational view showing additional features of the mechanism shown in Fig. 8.
Figure 10:
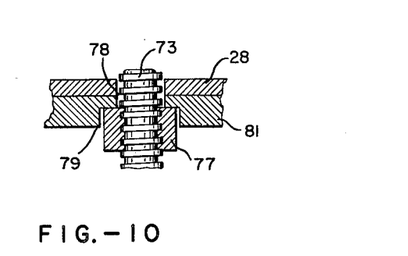
Fig. 10 is an elevational view taken at right angles to Fig. 9 showing further features of such arrangement.

Figs. 8, 9 and 10 show the structural features of a mechanism adapted to raise and lower the tilting table 28. This height adjusting mechanism includes the use of a drive shaft 66 mounted for rotation between a bearing support 67 that is secured to the frame 11, and an outer bearing support positioned in the front wall 23 of the frame 11. The outermost end 68 of the shaft 66 is provided with a dial crank 69 having index markings thereon (not shown) as necessary to facilitate accurate placement and adjustment of the height of the tilting table 28. The inner or operative end of the shaft 66 has a worm drive gear 71 mounted thereon for engagement with a gear 72 that is integrally formed with or attached to an upright rotating shaft 73 mounted for rotational movement in thrust bearing 74. The upper end of the shaft 73 is provided with a screw thread 76 for mating engagement with the threads of a sliding support nut 77. A slot of rectangular shape 78 is cut in the face of the tilting table 28 so that the longer dimension of the slot 78 is aligned with the shaft 66. The slot 78 is of sufficient width so that shaft 73 may freely pass upwardly therethrough as shown in Fig. 10. Nut 77 is held from turning by reason of its engagement in a slot 79 formed in a block 81 which is attached to the support table 28. As the table 28 is raised or lowered, nut 77 is free to move along the slot 79 but is constrained from turning with the shaft 73 by the side walls of the slot 79. It will be observed that with this arrangement rotation of the crank handle 69 in opposite directions will increase and decrease the elevation of the free end of the support table 28. This raising and lowering of the free end of the support table 28 provides for adequate adjustment in the depth of teeth being cut by the ridges 17 of the grinding drum 16 by adjusting the depth of cut that will be made by the ridges 17.

Figures 11, 12, 13:
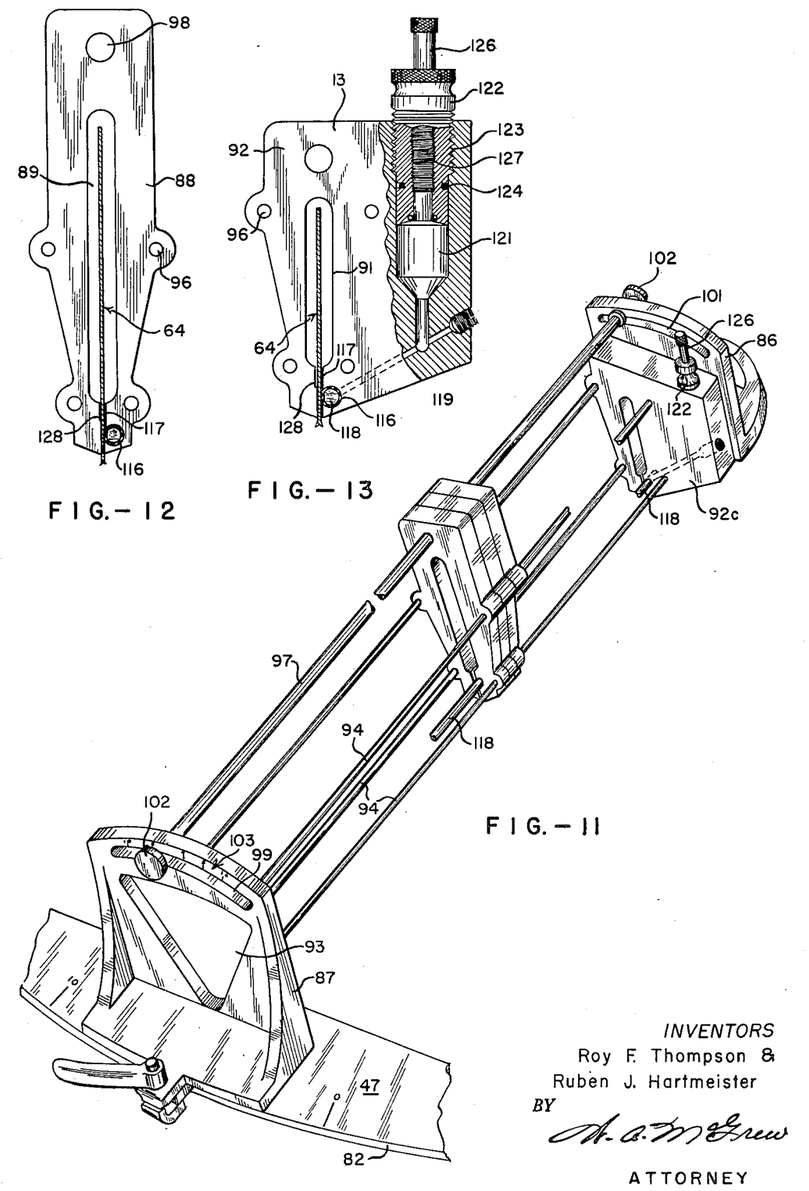
Fig. 11 is a perspective view in partial section showing features of the saw tilting and saw clamping device.
Fig. 12 is a cross-sectional elevation of a single element making up the saw clamping device of Fig. 11.
Fig. 13 is an elevational view in partial section showing the features of an hydraulically operated saw clamping device.

A device for clamping and holding saws that are to be sharpened in various positions of horizontal and vertical angularity with respect to the grinding drum 16 is shown in general detail in Fig. 1. The specific details of this saw clamping device are shown in Figs. 11, 12 and 13. Before reference to the specific figures, it should be noted in Fig. 1 that one edge 82 of the sliding table 47 is curved and further that the upper surface of such table 47 adjacent the curved edge 82 is scale marked to show radial positions with respect to zero position that is aligned with the shaft 14 of the grinding drum 16. Further it should be noted, though not shown, that a pivot is provided adjacent the opposite edge 83 of the sliding table 47 about which the saw clamping device 84 may be rotated in a horizontal plane. The saw clamping device 84 is itself made up of a plurality of parts disposed between the pivot and free ends 86 and 87 respectively, that are in contact with opposite sides of the sliding table 47.

Figs. 12 and 13 show the general shape of two separate parts or segments that make up the saw clamping device 84. The larger segment shown in Fig. 12 is intended for use adjacent to the free end 87 of the saw clamping device 84 and accordingly the central opening or slot 89 in the segment 88 is of greater length than the corresponding opening 91 in the smaller segments 92 that are used adjacent the pivot end 86 of the saw clamping device 84. This difference in sizes or lengths of the slots 89 and 91 compensates for the difference in the width of the saw blade outwardly from the handle toward the tip of the saw. Since in the present embodiment, the larger segments 88 are placed adjacent the free end 87 it is apparent that ordinarily the handle of any saw being sharpened will be adjacent this end and preferably the handle will be allowed to extend through the triangularly shaped opening 93 in the free end 87.

To tie all of the segments 88 and 92 together, a plurality of longitudinal rods 94 is provided to pass through the openings 96 in the segments 88 and 92. These rods 94 are provided with threaded means or other fastening devices on their outer ends in order to secure and hold the assembled segments together. Besides the tie rods 94, a position adjusting rod 97 is provided which extends through the opening 98 in the larger segments 88 and likewise through curved slots 99 and 101 in the free head 87 and pivot head 86. A lock nut 102 is provided on each end of the rod 97 so that the rod may be positioned and secured at various points along the slots 99 and 101. Scale markings 103 on the face of the free head 87 indicate the relative vertical positions of the saw clamping frame 84 and accordingly of the saw held therein.

A clamping element for holding the movable head 87 in adjusted horizontal position is shown in Figs. 1, 7 and 11. In these figures it will be noted that the lower section of the free head 87 is provided with an outwardly extending extension 106 having an opening 107 therethrough. A threaded lug 108 is positioned beneath the extension 106 and a clamping bolt 109 extends through the opening 107 for engagement with the threads 112 of the lug 108. The clamping bolt 109 is itself provided with a handle 113 that may be engaged and rotated to tighten the lug 108 against the lower lip of the edge 82 as necessary to securely hold the free head 87 in fixed position with respect to the sliding table 47.

It should be observed that with the foregoing adjustments it is possible to position the saw clamping device 84 at various horizontal positions either aligned with the axis of the grinding drum 16 or at various angles therewith. Deviation from the zero point which is the point of alignment with the axis of the grinding drum 16, makes it possible to cut relieved teeth having cutting faces disposed at other than right angles with respect to the plane of the saw blade. Primarily this horizontal adjustment permits relieving the front edge of the saw tooth as well as permitting changes in the spacing of saw teeth. Further, as previously stated, the position of the rod 97 and the associated nuts 102 may be changed to effect changes in the vertical positioning of the saw clamping member 84 and accordingly of any saw received therein. Any deviation from the zero position for this adjustment which indicates the vertical condition makes it possible to introduce a relief angle when shaping the gullet of the saw teeth. Both adjustments, working together, make possible the formation of saw teeth having an increased saw dust carrying capacity due to the resultant deeper gumming of the saw when the saw is tilted with respect to both horizontal and vertical planes along the axis of the cutting drum 16. In usual practice, the position of the saw clamping member will be adjusted so that it is at an angle with respect to both the horizontal and vertical zero positions. Accordingly, as the sliding table 47 is reciprocated along the guideways 49, the saw being held by the clamping member 84 will come into contact with the cutting ridges 17 of the grinding drum 16 at such an attitude that the teeth cut by the ridges 17 will be relieved on both the front and the back edges thereof.

In order to securely hold the blade of saws that are to be sharpened in the saw clamping member 84, a hydraulic type clamping device is utilized. The elements of this clamping device are shown in Figs. 13 and 11. In these figures it will be noted that an opening 116 is cut through each of the segments 88 and 92. As shown in Fig. 12, this opening 116 is of only partial circular form. The opening 116 being in part in direct communication with the face 117 of the clamping members 88 and 92. Flexible rubber tubing 118 is inserted in the opening 116 so that at least a portion of the tubing 118 is closed off while at the other end the center passage of the tube 118 is in direct communication with a passage 119 drilled through the end segment 92e as shown in Figures 11 and 13. This passage 119 communicates directly with a hydraulic reservoir 121.

When it is desired to use the clamping device 84 the reservoir 121 is filled with hydraulic or other suitable type of fluid. Threaded cap 122 is next inserted for engagement with the threads 123 of the end segment 92e. As shown the cap 122 provides suitable oilseals 124 to prevent the escape of liquid under pressure. The center of the cap 122 is drilled and threaded to receive a pressure plunger 126. It will be obvious that when the reservoir 121 has properly filled and the cap 123 is in place, adjustments in the positioning of the plunger 126 may be made by rotating said plunger. If the plunger is rotated to move its end 127 inwardly with respect to the cap 122, hydraulic fluid in the reservoir 121 will be displaced to increase the pressure in the hydraulic system formed by the elements described. This pressure increase will tend to expand the flexible rubber tubing 118 so that the portion thereof that is unrestrained by the opening 116 will move outwardly past the face 117 of the clamping segments 88 and 92. Necessarily the tubing 118 will come into contact with the side of any saw blade received in the slots 89 and 91, to securely hold the saw against face 128 of the segments 88 and 92. So long as the hydraulic pressure is maintained, the saw blade 64 will be held in fixed relative position with respect to the assembled clamping device 84 and when it is desired to remove the saw blade from the clamping device 84 it is only necessary to unscrew the plunger 126 so that the hydraulic pressure will be decreased and the flexible tubing 118 will again recede past the plane defined by the face 117 of the clamping members 84.

Once the saw has been clamped in the clamping device 84 and the proper horizontal and vertical angles have been selected to give the desired tooth relief angles control knob 42 as shown in Figures 3 and 5 may be rotated to align the cutting ridges 17 of the grinding drum 16 with teeth previously formed on the saw 64. Subsequently the control handle 69 may be rotated to raise or lower the tilting table as necessary to assure depth of cut which will be adequate to form a newly shaped saw tooth. As soon as these adjustments have been made, the motor 12 may be energized to rotate the grinding drum 16. When the proper speed has been attained, the sliding table 47 may be reciprocated along the guideways to move the saw blade 64 into contact with the cutting ridges 17 of the grinding drum 16. Since a plurality of the ridges 17 will come into contact with the saw blade, a plurality of spaced teeth will be formed in the face of the saw. Since the newly sharpened teeth will be spaced apart a distance greater than a single tooth space, some provision must be made for shifting the saw 64 longitudinally with respect to the grinding drum 16.

Figure 14:
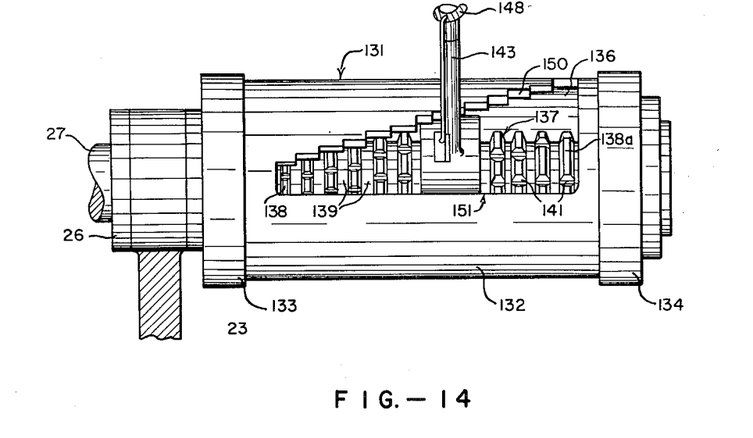
Fig. 14 is an enlarged assembled view of the selector mechanism shown in Fig. 1.
Figures 15, 16:
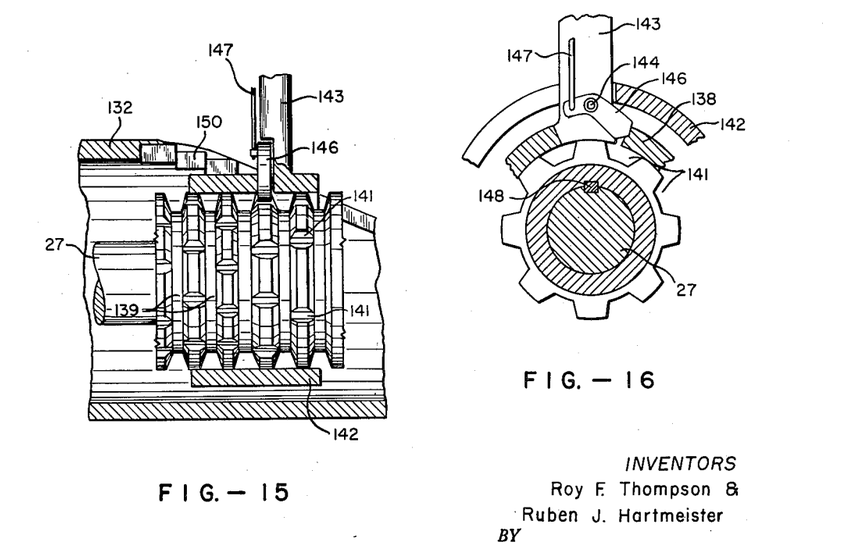
Fig. 15 is an elevational view in partial section showing operative features of the selector mechanism disclosed in Fig. 14.
Fig. 16 is a transverse elevational view showing additional features of the aforesaid selector mechanism which is used to control the number of teeth per unit of length being cut in the saw.

A mechanism for accurately shifting the saw in order to form any desired number of teeth per unit length is shown in Figs. 14, 15 and 16. In these figures and in Fig. 1 it will be noted that a position adjusting mechanism 131 is mounted on the wall 23 of the frame 11 closely adjacent to the tilting table support bearing 26. The adjusting mechanism itself which is directly connected to the shaft 27 is enclosed within a cylindrical housing 132 having end members 133 and 134 which provide bearing support for the shaft 27. The enclosure formed by these elements is further provided with an opening of step size; the step shaping of this opening 136 is provided to assure proper spacing of the teeth being formed on the saw blade.

The actual mechanism for spacing the teeth is designed to rotate shaft 27 and associated screw thread 33 through fixed arcs which cause the nut 32 to move fixed distances with respect to the shaft 27. In other words, since the pitch of the thread 33 and nut 32 are known, rotation of the shaft 27 and threads 33 through a fixed arc will cause a corresponding advance in the positioning of nut 32, support table 28, sliding table 47, saw clamping device 84 and saw 64 in such clamping device 84. To obtain proper and selective control of the degree of rotation of the threads 33 with respect to the nut 32, a hob type of wheel is mounted on the outer end of shaft 27 within the housing 131. This hob wheel 137 has a plurality of spaced ridges and grooves 138 and 139 formed thereon. Varying numbers of notches 141 are cut in each of the raised ridges 138 at equally spaced radial positions on each of the ridges 138. A sliding selector mechanism which is made up of a cylindrical portion 142 of internal diameter to engage the ridges 138 in sliding contact provides a support for a selector handle 143 which extends through the opening 136. At its lower end handle 143 provides support for pivot 144 upon which a ratchet member 146 is rotatably mounted. A push rod 147 interconnects one end of the ratchet 146 with a release button 148 on the top of the control handle 143. When the release button 148 is pressed the ratchet will be moved out of engagement with ridges 138 and the notches 141 cut therein so that the cylindrical member 142 may be moved along the length of the hob wheel 137 or so that the cylindrical support 142 may be rotated with respect to the hob wheel 137.

In practice the ridges 138 and the hob wheel 137 will have a progressively increasing number of notches 141 cut therein from one end of the wheel to the opposite ends thereof. For instance a first ridge 138a as shown in Fig. 14 may be provided with only two notches whereas ridge 138z at the opposite end of the hob wheel 137 may be provided with as many as 17 or 18 equally spaced notches.

If the selector handle is moved until the ratchet 146 comes into engagement with 138a rotation of the control handle 143 from a position of engagement with one notch 141 to a position of engagement with a second or subsequent notch will cause handle rotation of 180°. If after the handle is rotated into a position of contact with the stepped edges 150 it is then rotated in a reverse direction with the ratchet 146 in engagement with the notch 141, the hob wheel 137 which is keyed by means of key 148 to shaft 27, will be rotated through 180°. Before the control handle 143 comes into contact with the base edge 151 of the opening 136, this 180° rotation of the hob wheel 137 and shaft 27 will cause the adjusting nut 32 to be advanced a distance equal to ½ the lead distance of the thread 33. If the lead of thread 33 is equal to 1" the saw will be moved ½" by such rotation. If after such movement, another set of teeth are cut by the ridges 17 it will be found that the subsequent teeth are spaced ½" away from the teeth initially formed by the first cutting operation.

As the number of notches 141 in any particular ridge is increased, the radial rotation of control handle 143, when being moved from one notch to the next adjacent notch is correspondingly decreased. When the hob wheel 137 is correctly formed to provide a plurality of variously spaced notches it is possible by movement of the control handle 143 to advance the saw the desired distance as necessary to form saw teeth that are correctly spaced any desired distance.

From the foregoing it should be apparent that the present inventors have provided a saw sharpening device that is capable of forming in a highly efficient manner accurate and evenly spaced teeth in the face of a rectilinear saw. It is further believed that it will be quite apparent from the foregoing description that various modifications and changes in the structural elements presented is possible. For this reason the foregoing description is not intended to be limiting of the scope of the present invention but rather is intended only to show the feasibility and advantages of saw sharpening machines coming within the scope of the hereunto appended claims.

We claim:

1. A saw sharpening machine comprising a frame support structure, a cutting member mounted for rotation on said frame, a table adjustably supported on said frame above the said cutting member adapted for rectilinear movement toward and away from said cutting member, angularly adjustable saw supporting means in the form of an elongated member having a notch for receiving the blade of a saw located on said table and adapted to receive and hold a saw blade in a determined angular position for engagement with said cutting member, and means for shifting said table laterally with respect to its direction of rectilinear motion whereby to position said saw in lateral relation to said cutting member.

2. A saw sharpening machine comprising a frame support structure, a cutting member mounted for rotation on said frame, a table adjustably supported on said frame above the said cutting member adapted for rectilinear movement toward and away from said cutting member, a saw supporting member on said table having a notch adapted to receive and hold a saw blade in position for engagement with said cutting member, said saw supporting member rotatable on said table adapted to hold said saw in a determined angular position to said cutting member and threaded means for shifting said table laterally with respect to its direction of rectilinear motion whereby to position said saw in lateral relation to said cutting member.

3. A saw sharpening machine comprising a frame support structure, a cutting member mounted for rotation on said frame, a table adjustably supported on said frame above the said cutting member adapted for rectilinear movement toward and away from said cutting member, a saw supporting member on said table having an elongated notch adapted to receive and hold a saw blade in position for engagement with said cutting member, said saw supporting member rotatable on said table adapted to hold said saw in a determined angular position to said cutting member, threaded means for shifting said table laterally with respect to its direction of rectilinear motion whereby to position said saw in lateral relation to said cutting member, and stop means associated with said threaded means for selectively limiting rotational movement of said threaded means.

4. A saw sharpening machine comprising a frame support structure and a cutting member mounted for rotation on said frame about a substantially horizontal axis, a table support shaft on said frame positioned substantially parallel to the axis of said cutting member, a table supported by said shaft for positioning above said cutting member, saw support means on said table having an elongated notch for receiving and holding a saw blade in position for engagement with said cutting member, said saw supporting member rotatable on said table adapted to hold said saw in a determined angular position to said cutting member, and threaded means for longitudinally adjusting and positioning said shaft with respect to said cutting member as necessary to adjust positioning of said table and saw support with respect to said cutting member.

5. A saw sharpening machine comprising a frame support structure, a cutting member having its axis substantially horizontally mounted for rotation on said frame, a table support shaft on said frame with the axis of said shaft substantially parallel to the axis of said cutting member, a threaded member on said shaft, a support nut in threaded engagement with said threaded member, a table mounted for rotation about said shaft and interconnected with said nut, means for rotating the threaded member of said shaft with respect to said nut for adjusting the longitudinal positioning of said table with respect to said cutting member, and separate means for rotating said adjusting nut with respect to the threaded means of said shaft for making minor changes in the positioning of said table with respect to said cutting member.

6. In a saw sharpening machine, a saw support structure comprising an elongated member having a notch cut therethrough adapted to receive the blade of a saw, said member being further provided with a recess opening into the notch of said member and adapted to receive a section of flexible tubing, a length of flexible tubing received in said recess having at least one portion thereof exposed within said notch, a cylinder for holding hydraulic fluid, plunger means for decreasing the volume of said reservoir as necessary to increase the hydraulic pressure therein, and means interconnecting said reservoir and said flexible tubing whereby hydraulic fluid may be introduced under pressure into said tubing for expanding said tubing outwardly into said notch and against the blade of the saw received therein.

7. A saw sharpening machine comprising a frame support structure, a cutting member mounted for rotation on said frame having a cutting edge adapted to sharpen the teeth of saws, a saw support member adjustably mounted with respect to said frame and adapted to hold a saw in adjusted positions for engagement with said cutting member, threaded means for changing the relative positions of said cutting member and a saw received by said saw support member, a shaft member for rotating said threaded means, a plurality of circumferentially spaced projections on said shaft, a catch member adapted for engagement with said projections when it is desired to rotate the shaft, and a stop member for limiting the arcuate rotation of said catch member and shaft to limit relative motion of said saw and said cutting member.

8. A saw sharpening machine comprising a base support structure, a cutting member having its axis substantially horizontally mounted for rotation on said frame, said cutting member including evenly spaced apart individual cutting units, a tilting table reciprocally supported above said frame, means for adjusting the elevation of said tilting table with respect to said cutting member for determining the depth of tooth cut, a saw support member mounted on said table for holding a saw blade for engagement with said cutting member, means for holding said saw support at a determined angle with respect to the vertical plane passing along the cutting member axis, means for holding said saw support at a determined angle with respect to the horizontal plane passing along the cutting member axis, and means for laterally shifting said tilting table a determined amount with respect to its direction of rectilinear motion whereby to position said saw in lateral relation to said cutting member.

References Cited in the file of this patent

UNITED STATES PATENTS

| | | |
|---|---|---|
| 84,229 | Stewart | Nov. 17, 1868 |
| 360,679 | Gaskin | Apr. 5, 1887 |
| 361,767 | Gendron | Apr. 26, 1887 |
| 928,332 | Robinson | July 20, 1909 |
| 1,087,107 | Conrad | Feb. 17, 1914 |
| 1,117,595 | Oatley | Nov. 17, 1914 |
| 1,732,132 | Marshall | Oct. 15, 1929 |
| 2,305,564 | Tubbs | Dec. 15, 1942 |
| 2,431,469 | Eyles | Nov. 25, 1947 |
| 2,436,004 | Hall | Feb. 17, 1948 |
| 2,491,047 | Hunt et al. | Dec. 13, 1949 |